Nov. 10, 1959     F. G. WILLEY     2,911,876
VIDEO DISPLAY DEVICE
Filed July 19, 1955
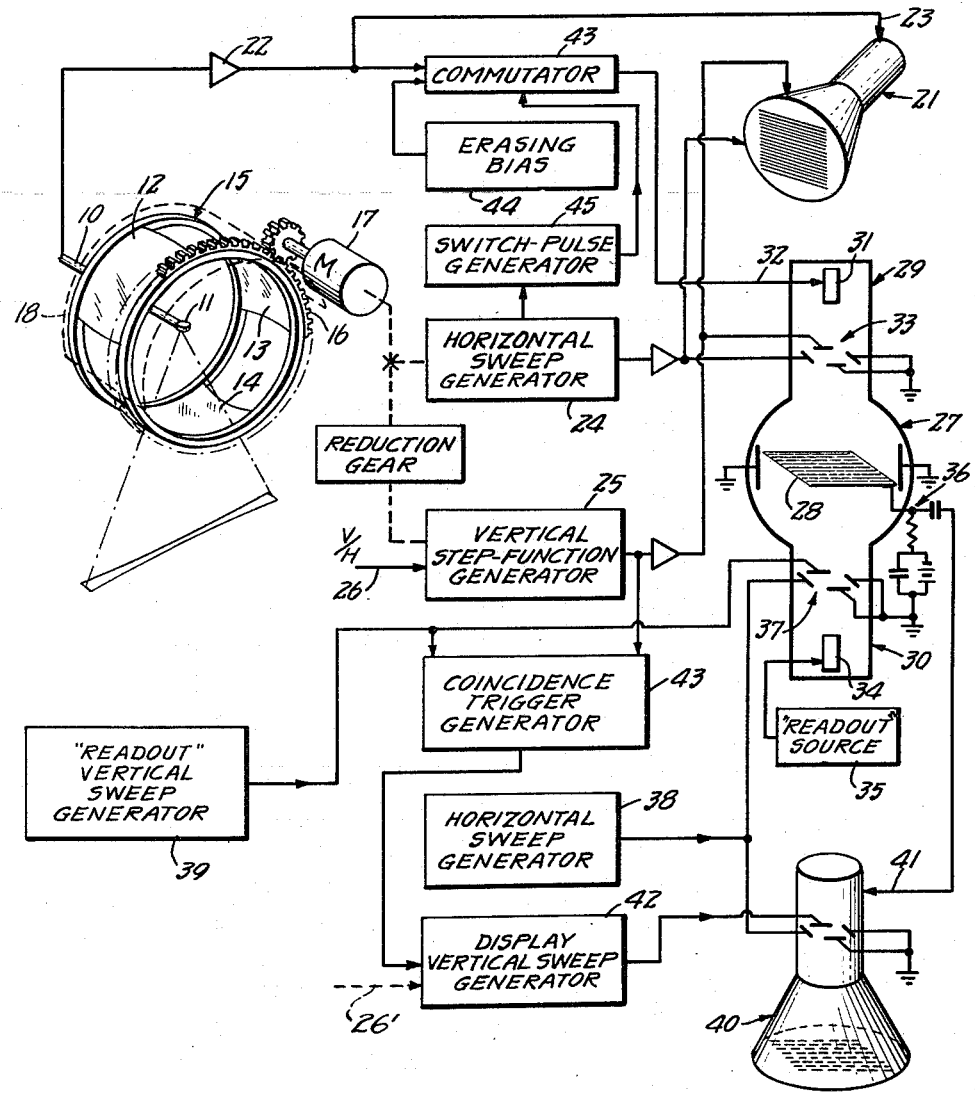
INVENTOR.
FRANK G. WILLEY
BY
*Mitchell & Bechert*
ATTORNEYS

United States Patent Office 2,911,876
Patented Nov. 10, 1959

2,911,876

VIDEO DISPLAY DEVICE

Frank G. Willey, Roslyn Heights, N.Y., assignor to Servo Corporation of America, New Hyde Park, N.Y., a corporation of New York Application July 19, 1955, Serial No. 523,020

5 Claims. (Cl. 88—1)

My invention relates to automatic scanning mechanisms for continuously scanning a field of view and, in particular, to those in which the intelligence from a plurality of successively scanned lines in said field is to be integrated into a frame. The present invention is in the nature of an improvement over that disclosed in the copending application of Henry Blackstone and Frank G. Willey, Serial No. 320,272, filed November 13, 1952, and in copending Blackstone application Serial No. 394,346, filed November 25, 1953.

In scanning mechanisms of the class described in said copending applications, the number of lines of scanned intelligence available at any time is limited by the number of sensitive elements, and if the intelligence is to be instantaneously available as a frame of successive lines, then one must either make a permanent record of all scanned lines, as on a moving film or on a moving paper-strip record, or one must employ a long-persistence device, such as a cathode-ray oscillograph, to develop a full frame of intelligence and to hold such frame for interpretation. In the latter case, the frame presentation must be periodically indexed because, to develop the frame, one component of beam deflection, i.e. that transverse to the scan-line presentation, must be depressed and, of course, this depression will ultimately progress off the face of the oscillograph. This periodic indexing of frames presents a serious handicap to the interpretation of the scanned information.

It is, accordingly, an object of my invention to provide an improved display means for scanners of the character indicated.

It is another object to provide an energy-storing device in combination with scanners of the character indicated, and capable of storing at all times the video intelligence developed by the scanner over a given plurality of most recent line scans, whereby the stored information may be available for effectively continuous display about a reference that is always based on the currently scanned intelligence.

More specifically, it is an object to provide an energy-storing device for storing an entire frame of intelligence and including means for continuously scanning this frame at a high rate, said frame always representing the most recent current frame of intelligence.

For one specific application of the invention, it is an object to provide an improved aerial-reconnaissance device utilizing a continuously rotating line-scanner and a storage device, and so displaying the stored information as to present the appearance of a window aligned with the axis of the scanner, with the scanned field migrating across the display as the aircraft covers the terrain beneath.

Another specific object is to meet the above objects with completely electronic storage means.

Other objects and various further features of novelty and invention will be pointed out or will occur to those skilled in the art from a reading of the following specification in conjunction with the accompanying drawing. Said drawing shows an electrical block diagram schematically indicating component parts of a scanner, storing mechanism, and display device of the invention.

Briefly stated, my invention contemplates, in conjunction with a scanner and display of the character indicated, the employment of an all-electronic data-storing device capable of handling a sufficient number of successive scanned lines of video intelligence to produce a display frame. In a preferred form, the storage device is a cathode-ray type storage tube having a storage mosaic accommodating sufficient lines to produce the display frame. The arrangement of the storage device is such that it will always store the latest full frame of intelligence, commencing always with the latest developed scan line and extending always for the full number of lines per frame.

In the particular arrangement to be described, the scanning device inherently produces video intelligence which is approximately 50 percent utilizable and 50 percent non-utilizable, by reason of the time required for the scanning optics to enter and to leave the field, and I arrange for erasing signals to be interlaced with the utilizable video-line intelligence, so that each new incoming line may be applied to a freshly erased line in the mosaic. On the read-out side of the storage tube, scanning is accomplished at a very much higher rate than that of the input intelligence. In fact, if desired, a new frame may be read-out for every new line developed by the scanner. For display purposes, the read-out frame-intelligence is "dephased," as necessary, in order that all lines presented in the ultimate display are in a single proper sequence, the latest line of fresh video being then always presented at one limit of the display, so that the display may be said to be "based" on the latest or freshest video line.

Referring to the drawing, my invention is shown in application to line-scanning means of the type disclosed in greater detail in said copending patent applications. Such scanning means may comprise a support 10 fixedly carrying energy-responsive means 11. Collecting optics, including a plurality of mirrors 12—13—14 may be mounted on a scanner ring or drum 15 journalled (by means not shown) in relation to the support 10 for rotation about and focused on the energy-responsive means 11. Peripheral gear means 16 may be driven by a motor 17 to produce continuous unidirectional scanning action. For the configuration shown, that is, with three collecting mirrors spaced equally about the scanner axis, the angular field of view for directly utilizable intelligence is substantially 60 degrees, and a peripheral shield (suggested by the dashed outline 18) fixed with respect to the support means 10 may serve to screen the scanner from energy not needed for coverage of the optically scanned field.

It is a property of scanners of the character indicated that about fifty percent of the full scanning cycle produces directly utilizable intelligence, but the remaining fifty percent of such cycle is consumed in getting each successive optical system into the field of view and out of the field of view, all as more fully explained in said applications. As also pointed out in said applications, scanners of the character indicated may be employed as aids for aerial reconnaissance, and, in such case, the scanned field of view is preferably generally downward, with the scanner axis substantially aligned with the flight axis.

As further pointed out in said applications, display means, which may include a cathode-ray oscillograph 21, may develop a frame presentation for a plurality of successive scan lines produced by the described scanner, relying on the persistence characteristics of the tube 21 to preserve the frame development. In such case, signalprocessing means including amplifying means 22, may respond to the output of the energy-responsive means 11 to provide signals for intensity-modulation (at 23) of the tube 21. Horizontal sweep signals may be provided by a generator 24, and vertical sweep or step-function signals by a generator 25, the horizontal sweep being synchronized with the line scanning frequency, and the vertical-sweep amplitude being governed by the velocity altitude function (hereinafter called the $V/H$ rate) of the aircraft, as suggested at 26.

For some purposes, the difficulty with the arrangement thus far described has been that the frame display at 21 is developed on a line-by-line basis, that is, each scan line placed on the face of the tube 21 occurs at substantially the same instant that the scan line is developed by the rotary scanner. Such scanned line will, therefore, be displayed at a fixed position on the face of the tube 21, and the next scan line must be displayed at a given vertically displaced location away from the first scan line. When all the lines have been displayed for a given frame, the latest line is at the end of the frame, and a new frame must be commenced at the opposite side of the display. Such operation results in intermittent presentations of relatively widely spaced frames, and each line of scanned intelligence is presented only once. Such line, once presented, may be preserved by the persistence characteristics of the tube face, but it is necessary to index the reference for interpretation of the frame, for each successive frame presented.

In accordance with the invention, I obviate the described difficulties of the previous arrangement by employing a storage device which will always remember the intelligence developed in all the scan lines of the latest frame, and I continuously scan such latest frame in order to present, in effect, a "moving" picture at display tube 40, rather than successive "still" frames on the face of the tube 21.

In the form shown, the storage device is all-electronic and comprises a cathode-ray-type storage tube 27 containing a storage mosaic 28, in conjunction with input or writing means 29 and read-out means 30. The writing means may include an electron gun 31, so devised as to accept intensity-modulation signals at 32. The system 33 for deflecting the writing beam over the face of the mosaic 28 may be electromagnetic or electrostatic; and I show two mutually perpendicular systems which, for convenience only, will be referred to as the horizontal system (served by sweep-generator 24) and the vertical system (served by vertical step-function generator 25). The read-out half 30 of the tube 27 may include another electron gun 34; gun 34 is shown supplied at 35 with a steady read-out potential, and the read-out modulations may be available at an output circuit 36 connected to the mosaic 28. The read-out half of the tube 27 includes a separate deflection system 37 which may resemble the system 33, but which is supplied by separate sweep potentials, available from a horizontal-sweep generator 38 and a vertical-sweep generator 39.

In order to accomplish something of the order of a full read-out frame for each new scanning line applied to the mosaic 28, the sweep circuits 38—39 must operate at frequencies substantially elevated with respect to, but not necessarily synchronized with, those of the corresponding generators 24—25. The read-out video signal will be characterized by the desired succession of lines necessary to create more frequently repetitive full frames. However, the start of each read-out frame will not necessarily appear at a limit of the mosaic frame.

As mentioned above, the tube 40 is used for display of the video scanned from the mosaic 28. This video output (from circuit 36) is connected at 41 to the intensity-modulation means of the tube 40, and the horizontal-deflection system of the tube 40 is served by the same horizontal-sweep generator 38 as supplies the read-out end 30 of the storage device 27. For properly orienting the display frames, I show provision of a special vertical-sweep generator 42, serving the vertical-deflection system of only the tube 40. The sweep generator 42 preferably operates at substantially the same frequency as the generator 39, but with the sweep signal thereof "dephased" with respect to the vertical sweep signal of generator 39. Dephasing in the form shown is accomplished merely by providing suitably synchronized trigger pulses to determine initiation of sweep at generator 42. For this purpose, I show a coincidence trigger generator 43 responsive to the instantaneous coincidence of vertical deflection voltages developed by generators 25 and 39. Upon such coincidence, a synchronizing pulse is supplied to the generator 42 and a new display frame or raster is initiated on the face of the tube 40.

In order that the mosaic 28 shall always have a "clean" line space available for accommodation of the latest scan line of video signal, I provide for erasure of the oldest scan line on the mosaic immediately before applying the latest scan line. This may be accomplished by interlacing or time-multiplexing "erasing" signals with scan-line signals in line 32, and since the input video is subject to a fifty-percent availability limitation, I can make use of the dead-time or non-utilizable half of the scan cycle for erasing purposes. In the form shown, erasing bias is supplied by a source 44, and a commutator 43 performs the interlace function. Commutator 43 is governed by a switch-pulse generator 45, synchronized with the horizontal-sweep repetition frequency.

In operation, commutator 43 serves to channel into line 32 video signals characterized by fully utilizable scan lines, interlaced with erase-bias signals of at least the time duration of a scan line. The horizontal sweep from generator 24 recycles twice for each scan cycle, meaning one horizontal sweep for the scan video line, and one horizontal sweep for the erase-bias signal. The step-function of generator 25 is preferably so synchronized with the scan frequency that, for each voltage step of said function, the erasing function immediately precedes the video line; the mosaic 28 can thus be fully "loaded" with sufficient lines to make the desired frame, and only the most stale of stored lines will be erased.

Meanwhile, at a high scanning rate, sufficient to scan the whole mosaic 28 at least once for each scan-line cycle, generators 38—39 enable development at 41 of a video signal for intensity-modulating the display means 40. Every time the voltages of vertical-sweep generators 25—39 coincide, a new vertical sweep will be initiated at generator 42, thus beginning a new display frame. Since this voltage coincidence can only occur when a new scan line or a new erase line is being developed, assurance may be had that the display raster is always referenced to the latest scan line.

It will be appreciated that I have described an improved storage and display means for scanners of the character indicated. My storage device permits maximum integration of accumulated data, the latter being always presented on a "current" basis, referenced to the latest scan line. My device presents repeated fresh frames with the same periodicity as fresh lines are available. In application to aerial reconnaissance, $V/H$-rate correction applied at 26 to control the voltage-step increments of generator 25 may be sufficient to assure appropriate and corresponding correction in the display at 40, provided the sweep frequency of generator 38 is faster than the scan-video line rate, by a multiple exceeding the number of lines per frame; alternatively, $V/H$-rate correction may be applied to control the amplitude of the vertical sweep at 42 (suggested at 26'), as will be understood, and in the latter event the sweep rate at 38 need only be the lines per frame times the sweep rate at 24.

While I have described the invention in detail for the preferred form shown, it will be understood that modifications can be made within the scope of the invention as defined in the claims which follow.

I claim:

1. In a scanning mechanism of the character indicated, line-scanning means producing a video output signal, frame-storing means comprising a signal-converter tube having writing means including a gun, reading means including a gun, and separate mutually perpendicular deflection systems for the beams developed by said guns, means applying said video-output signal to said writing means, horizontal-sweep means for the horizontal deflection of said writing beam and synchronized with the line period of said line scanning means, vertical-deflection means for said writing beam and synchronized at a reduced frequency with said line period, whereby a number of lines of scanned intelligence may be stored in said tube, read-out means for said tube including horizontal and vertical sweep generators for the deflection system for said read-out beam, a coincidence detector developing a synchronizing signal in response to coincidence of the voltage developed by said vertical-sweep generators, and cathode-ray display means, including horizontal and vertical deflection circuits, said horizontal deflection circuit being connected to said read-out horizontal sweep generator, said display means further including intensity modulation means connected to the output of said read-out circuit, and a display vertical-sweep generator for said display vertical-deflection means, said display vertical-sweep generator being synchronized by said coincidence detector.

2. In a scanning mechanism of the character indicated, a scanner including a support, energy-responsive means fixedly carried by said support, an optical system journalled on said support and rotatable about said energy-responsive means, whereby energy collected by said optical system and scanned during rotation thereof may be focused on said energy-responsive means, an electronic storage tube including a storage mosaic and writing and read-out circuits, said writing circuit being connected to the output of said energy-responsive means and continuously storing over the face of said mosaic a plurality of successive scan lines, said read-out circuit including means continuously scanning said mosaic at a rate substantially exceeding the line-scanning rate of said scanner, and display means including a cathode-ray oscilloscope intensity-modulated by the scanned output of said storage tube, and means responsive to the time coincidence of scan by said read-out means of the current writing line produced by said writing means on said mosaic, said cathode-ray oscilloscope including vertical-deflection means synchronized by the output of said last-defined means.

3. In a scanning mechanism of the character indicated, a scanner including a support, energy-responsive means fixedly carried by said support, an optical system journalled on said support and rotatable about said energy-responsive means, whereby energy collected by said optical system and scanned during rotation thereof may be focused on said energy-responsive means, a storage surface, writing and read-out circuits for said surface, separate vertical and horizontal sweep means for said respective writing and read-out circuits, and display means including intensity-modulation means connected to said read-out circuit and vertical-sweep means synchronized to recycle upon voltage coincidence of said writing and read-out vertical sweeps.

4. A mechanism according to claim 3, in which said read-out horizontal sweep means is connected both to said read-out circuit and to said display means.

5. A mechanism according to claim 3, in which said display vertical-sweep means includes amplitude-control means responsive to the velocity-altitude function of an aircraft.

References Cited in the file of this patent

UNITED STATES PATENTS

| | | |
|---|---|---|
| 2,581,589 | Herbst | Jan. 8, 1952 |
| 2,718,609 | Covely | Sept. 20, 1955 |
| 2,743,378 | Covely | Apr. 24, 1956 |
| 2,859,652 | Hopgood | Nov. 11, 1958 |